Aug. 23, 1966  M. C. VOISINE  3,267,989
FOLDING SCREEN
Filed Jan. 21, 1963  7 Sheets-Sheet 1
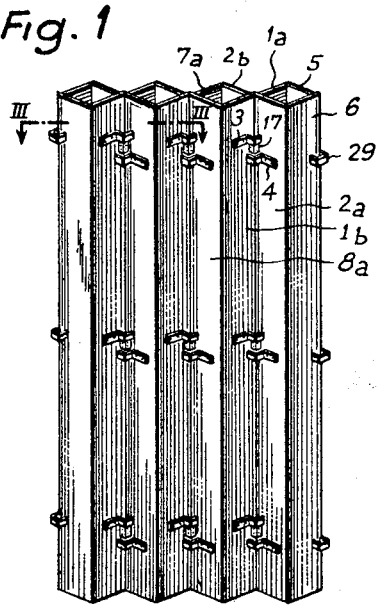
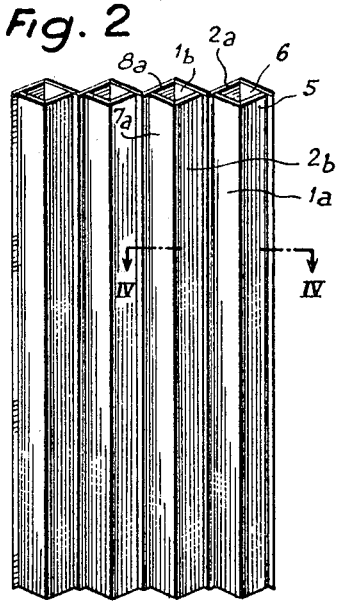
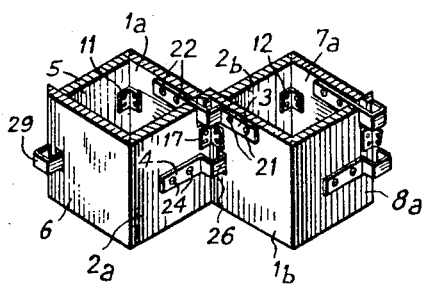
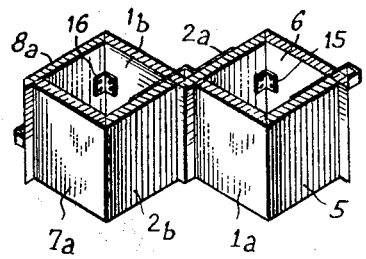
INVENTOR
MARC CLAUDE VOISINE

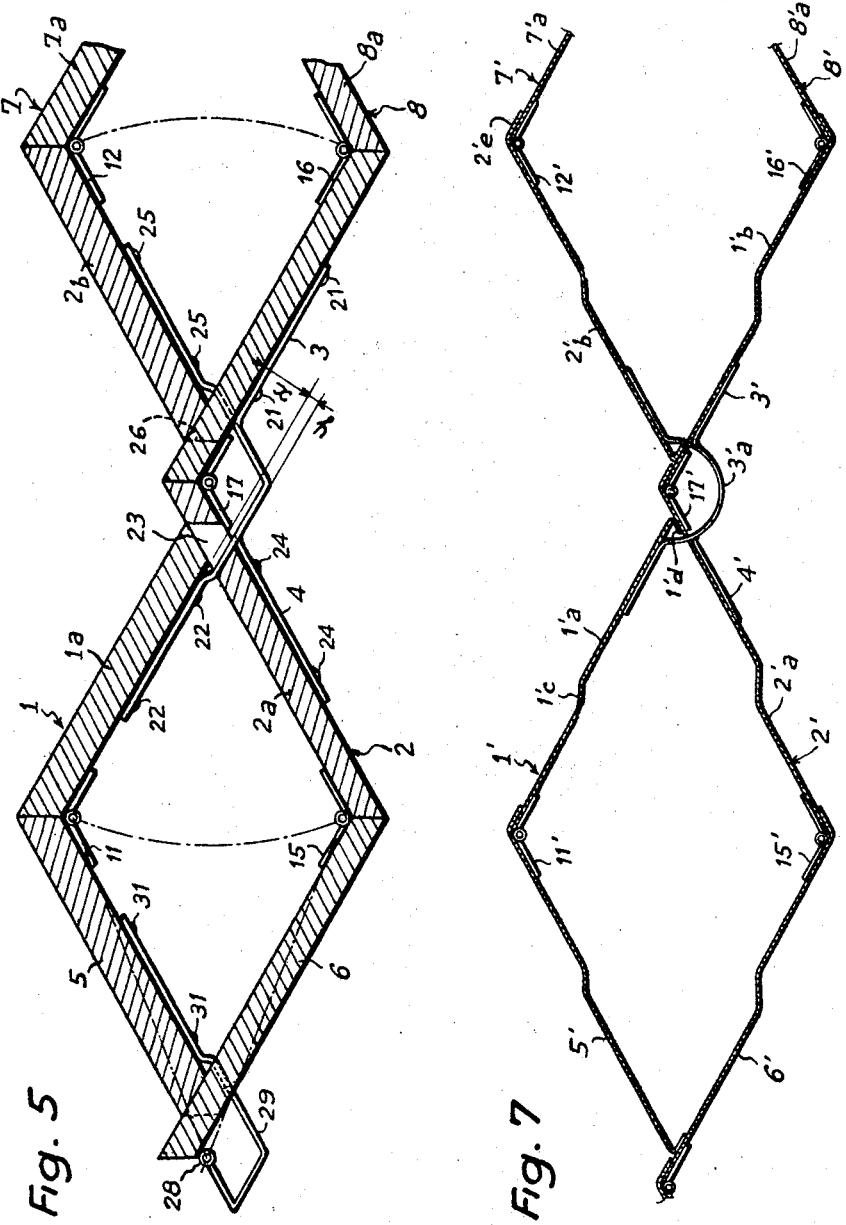

INVENTOR
MARC CLAUDE VOISINE

Aug. 23, 1966     M. C. VOISINE     3,267,989
FOLDING SCREEN
Filed Jan. 21, 1963     7 Sheets-Sheet 4

INVENTOR
MARC CLAUDE VOISINE

Aug. 23, 1966 M. C. VOISINE 3,267,989
FOLDING SCREEN
Filed Jan. 21, 1963 7 Sheets-Sheet 5
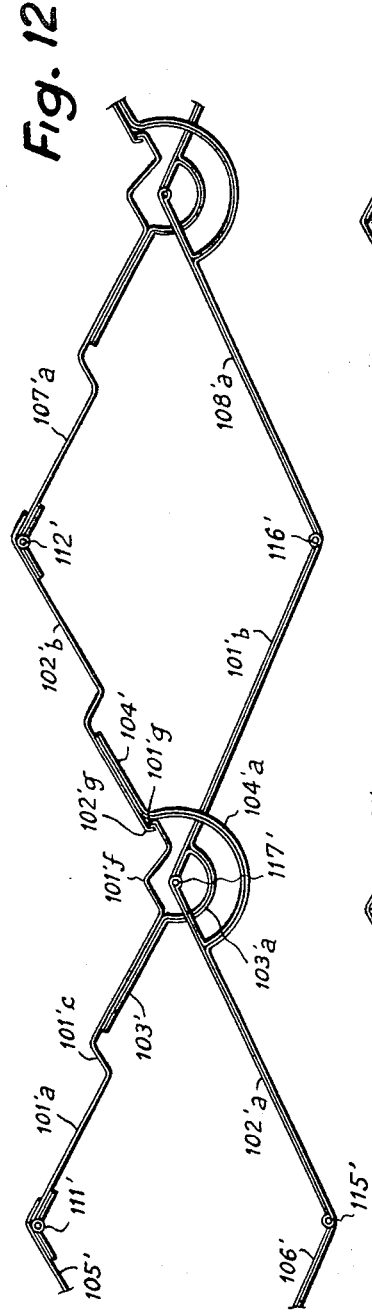
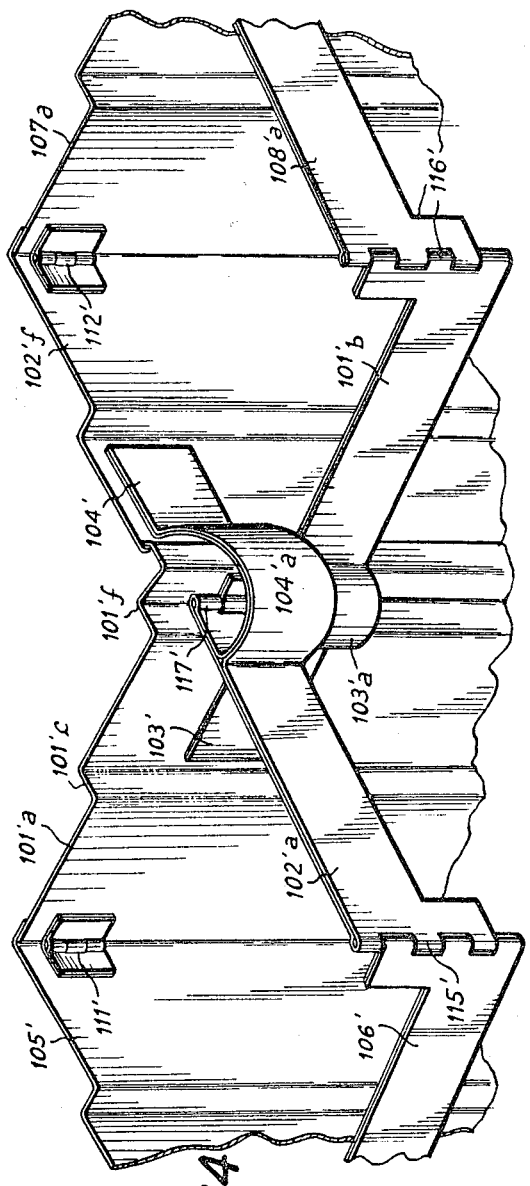
INVENTOR
MARC CLAUDE VOISINE

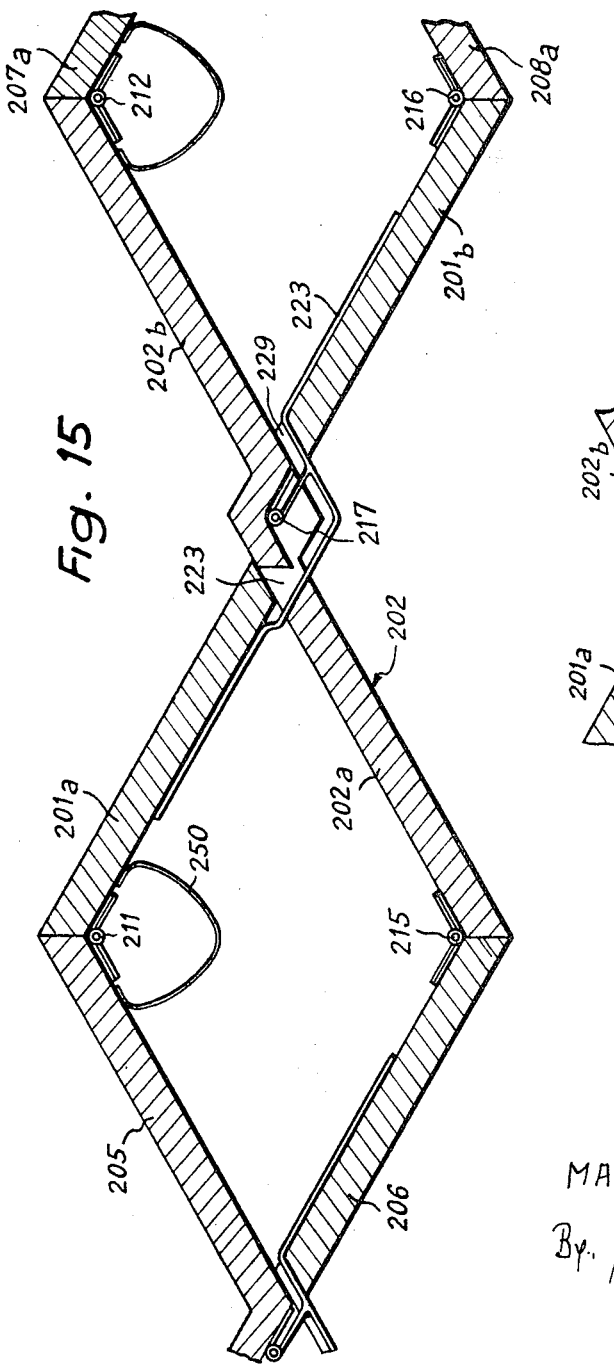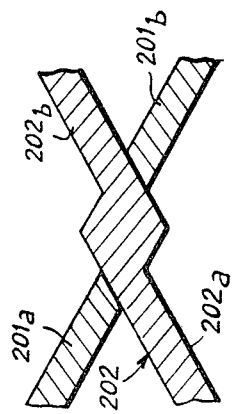

Aug. 23, 1966    M. C. VOISINE    3,267,989
FOLDING SCREEN

Filed Jan. 21, 1963    7 Sheets-Sheet 7

INVENTOR
MARC CLAUDE VOISINE

United States Patent Office 3,267,989
Patented August 23, 1966

3,267,989
FOLDING SCREEN
Marc Claude Voisine, Cande, Maine et Loire, France
Filed Jan. 21, 1963, Ser. No. 252,824
Claims priority, application France, Jan. 22, 1962, 885,463, Patent 1,312,746; Mar. 10, 1962, 890,647; Dec. 4, 1962, 894,236
1 Claim. (Cl. 160—84)

The invention relates to a folding screen.

Folding screens of the accordion type are already known, comprising a jointed frame, usually in the form of pantograph, arranged in horizontal and/or vertical planes, covered with flexible material such as, for example, a sheet of relatively thick and firm synthetic plastic material.

The general object of the invention is to make a folding screen formed of rigid panels of, for example, wood or metal sheet.

The invention consists of a folding screen comprising equal rectangular panels which are jointed together along their longer sides and are each rigidly connected with connecting pieces disposed substantially in the extension of their planes and themselves jointed together to form with the adjacent panels, in planes perpendicular to the axes of the said joints, jointed lozenges, allowing the screen as a whole to be opened out in a generally undulating configuration or, alternatively, folded up with its panels laid substantially flat against each other, the joints being so arranged that their axes are situated, on the side of the outer surface of the panels, at the points of the lozenges where the lozenges are joined together, and, on the side of the inner surface of the panels, at the two other points of the lozenges.

By means of this construction it is possible to make rigid folding screens which are easily maneuvered, are of very limited dimensions when folded up, can be mass-produced at low cost, can be taken apart on one side only so as to be usable for outside fastenings, and can be rainproof. The panels may be of wood or metal and may be made in any decorative shape desired.

In one embodiment the connecting pieces of the panels consist of arms, and in another of auxiliary panels with dimensions substantially equal to those of the first panels.

With these and other objects in view, which will become apparent in the following detailed description, the present invention will be clearly understood in connection with the accompanying drawings, in which:

FIG. 1 is a front perspective view of part of a folding screen in which the main and auxiliary panels are wooden;

FIG. 2 is a rear perspective view of the part of a screen shown in FIG. 1;

Figure 13:
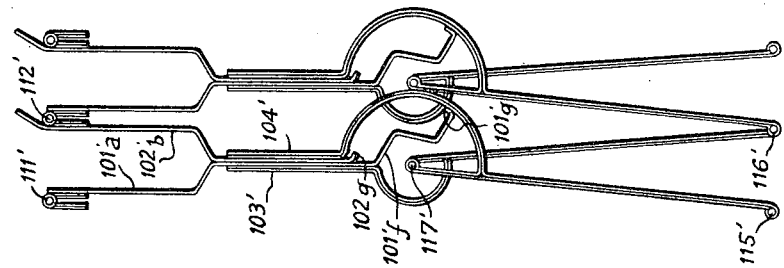
Figure 10:
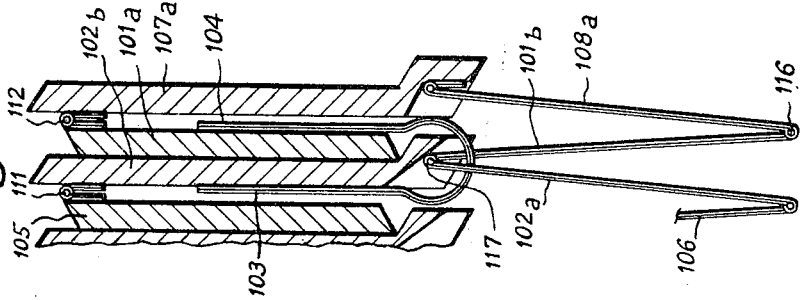
Figure 8:
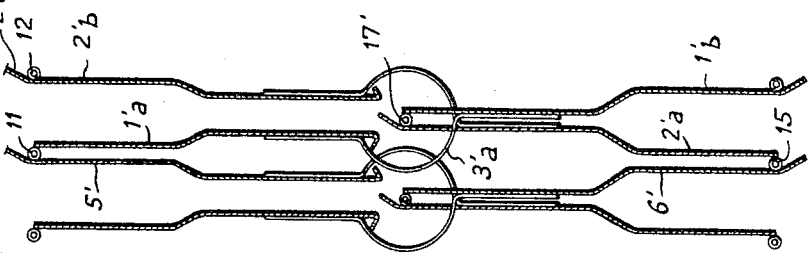
Figure 6:
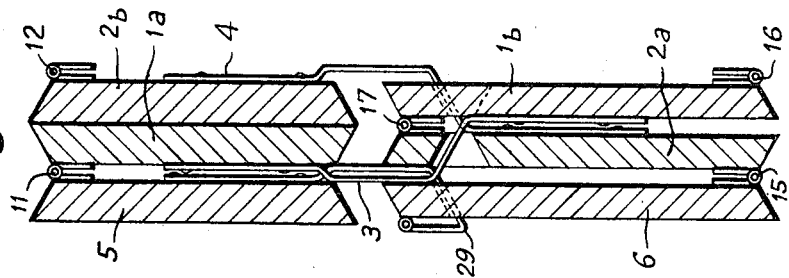
Figures 9, 11:
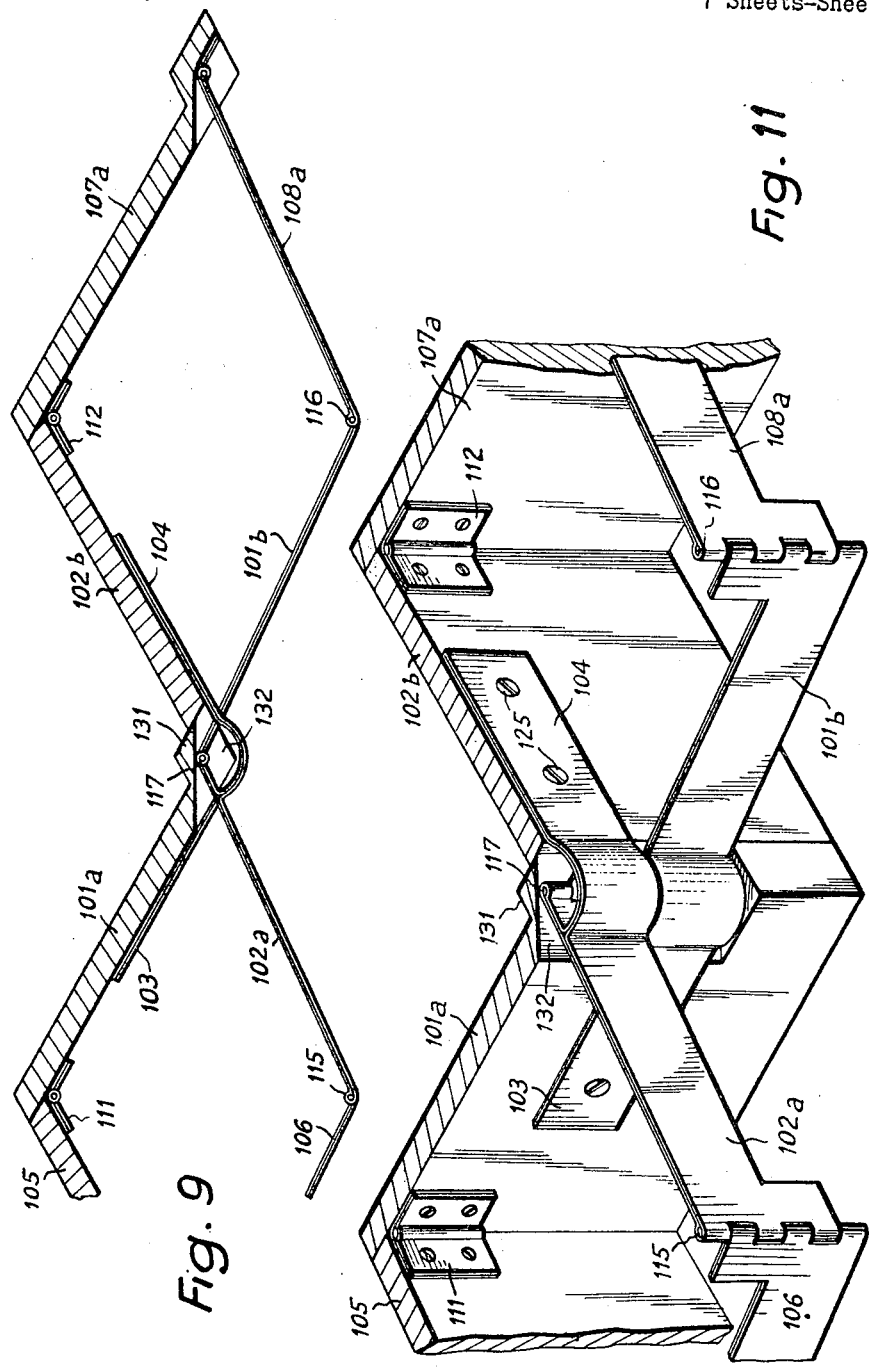
Figure 18:
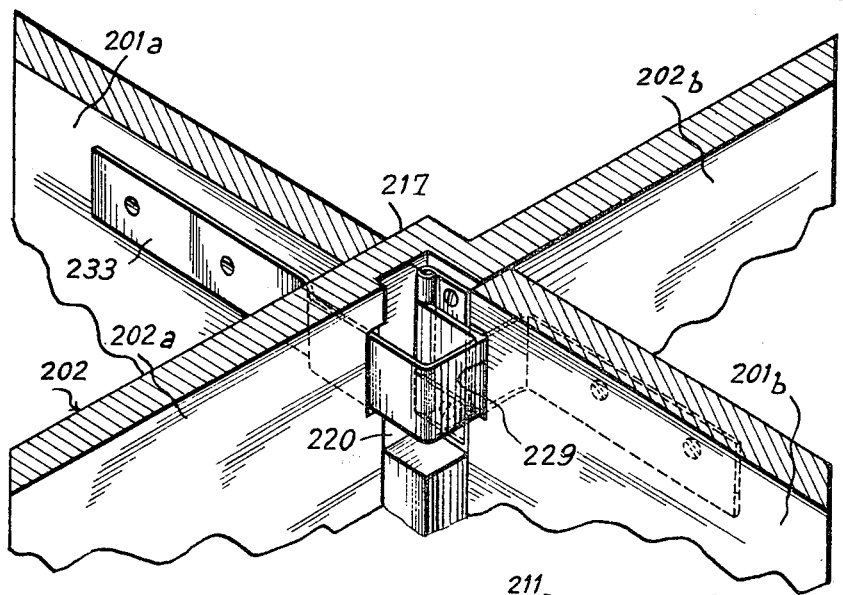
Figure 16:
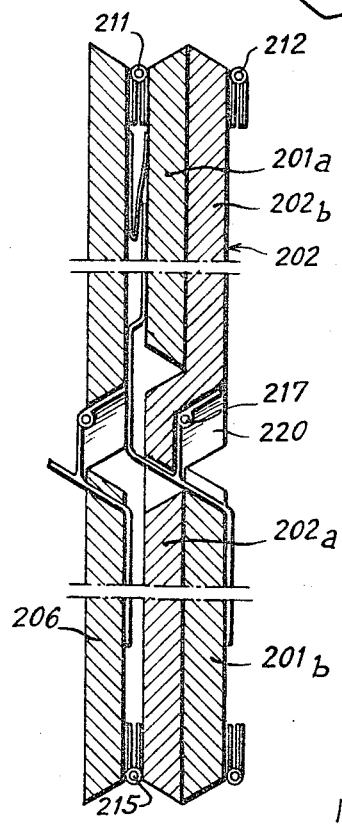

FIG. 3, which is on a larger scale, is a section along the line III—III in FIG. 1;

FIG. 4, also on a larger scale, is a section along the line IV—IV in FIG. 2;

FIG. 5, which is on a still larger scale, is a plan view corresponding to FIG. 3;

FIG. 6 shows, on the scale of FIG. 5, the same portion of screen folded up;

FIG. 7 is a plan view corresponding to FIG. 5 of an embodiment in which the main and auxiliary panels are in sheet metal;

FIG. 8 shows folded up the portion of screen in FIG. 7;

FIG. 9 is a view, corresponding to FIG. 5, of an embodiment comprising main panels in wood joined together by connecting arms;

FIG. 10 shows the portion of screen from FIG. 9 folded once;

FIG. 11 is a perspective view of the portion of screen from FIG. 9;

FIG. 12 is a view similar to FIG. 7, but here the connecting pieces of the sheet metal main panels consist of connecting strips instead of auxiliary panels;

FIG. 13 shows the portion of screen from FIG. 12 folded up;

FIG. 14 is a perspective view of the portion of screen from FIG. 12;

FIG. 15 is a view corresponding to FIG. 5, but of an embodiment in which one main panel out of two is in one piece with the auxiliary panel situated substantially in its plane;

FIG. 16 shows the porton of screen from FIG. 15 folded;

FIG. 17 shows the covering of the joints of the screen shown in FIG. 15 at a level different from that of the hinges; and FIG. 18 is a perspective view of the junction of the portion of screen shown in FIG. 15.

The folding screen shown from in front and from behind respectively in FIGURES 1 and 2 is composed of several groups of panels such as 1 and 2 (FIGS. 3 to 5) jointed together to form sorts of crosspieces. Each panel like panel 1 comprises two panels 1a and 1b rigidly connected by strips 3. Similarly, each panel like panel 2 is composed of two panels 2a and 2b rigidly connected by other strips 4.

Each end of the screen is formed of only two, simple panels 5 and 6.

The panels such as 5, 1a, 2b, 7a, which will hereafter be called main panels, are on the outer surface of the screen, i.e. the side on which the hinges are not visible or accessible, while the panels such as 6, 2a, 1b, 8a act as connections between the main panels, and will hereafter be called auxiliary panels.

The main panels are jointed to each other by means of hinges such as 11, 12 situated on the internal surfaces of these panels at the non-adjacent vertices of the jointed lozenges formed by the junctions, while the auxiliary panels are jointed to each other on the one hand by hinges 15, 16 placed against the internal surfaces also of these auxiliary panels and at the vertices of the lozenges opposite to the vertices mentioned above, and on the other hand by hinges 17, the axes of which, situated at the centres of the junctions, are at the intersections of the planes of the external surfaces of the main panels such as 1a, 2b and at the same time on the line of intersection of the planes of the external surfaces of the auxiliary panels such as 2a and 1b.

The axes of three hinges such as 11, 17 and 16 are always aligned and equidistant. The same applies to the axes of hinges such as 15, 17 and 12.

The edges of the panels are cut aslant (at 60° in the example shown) so that they can lie against each other at the locations of the outside vertices of the lozenges and against the surfaces of the corresponding panels, in the region of the vertices where two adjacent lozenges are jointed together.

The planes of the two panels 1a and 1b and the planes of the two panels 2a and 2b of each junction are offset relative to each other in such a way that the plane of the outside surface of a main panel, such as 1a, is substantially in the plane of the outside surface of the auxiliary panel, such as 1b, with which it is rigidly connected.

The strips 3 connecting one of the auxiliary panel 1b of a junction rigidly to the main panel 1a belonging to it are double-angled and are fixed to the panels by screws 21, 22; they pass through the other auxiliary panel 2a of the junction via slots 23 in this panel 2a.

Similarly, the strips 4 connecting the other auxiliary panel 2a rigidly to the other main panel 2b of the same junction are also double-angled and fixed to the panels by screws 24, 25 respectively. They pass through openings 26 in the auxiliary panel 1b.

In the example shown, the thickness of the outside panels 1a, 2b is equal to the thickness of the auxiliary panels 2a, 1b plus half the thickness of a hinge such as 11. The offset of the two branches of a connecting strip 3, indicated at $x$ in FIGURE 5, is equal to the thickness of the auxiliary panels 2a or 1b plus the thickness of the hinges such as 17. The marking $y$ in FIGURE 5, which represents the offset of the central portion of a strip 3 relative to the portion lying against the inside surface of the corresponding main panel 1a, depends on the thickness of the hinge and that of that strip; it determines the position of the openings in the auxiliary panels, the aim being to make these openings invisible from behind the screen, as FIGURE 2 shows.

Each of the two ends of the screen terminates in two simple panels such as 5 and 6, jointed together by means of a hinge 28 fixed on the one hand to the corresponding auxiliary panel 6 and on the other to a strip 29 bent twice in the same direction and fixed to the panel 5 by screws 31 against the inside surface of this panel.

The different components of the folding screen are assembled as follows: All the auxiliary panels such as 2a, 1b, 8a are assembled in a chain and the connecting strips 3 and 4 are mounted on the main panels 1a, 2b, 7a after being passed through the corresponding openings such as 23, 26.

Folding of the screen takes place by bringing towards each other the acute-angled vertices of the lozenges, so that all the panels pivot simultaneously about the geometrical axes of their hinges until they occupy the positions shown in FIGURE 6, i.e. they are folded flat against each other. During this movement the acute angles of the edges of the panels pass very near to each other without touching.

This makes a folding screen with rigid panels whose good appearance is preserved, because no fitting, such as a connecting link or hinge, and no slot can be seen from the side of the outside surface of the main panels 1a, 2b, etc.

When unfolded, therefore, the screen as a whole has the form of a continuous undulating surface. The particular structure of the whole and the arrangement of the hinges permit very easy opening and closing of the screen.

In FIGS. 7 and 8 another embodiment is shown in which the general arrangement of the members is substantially the same as in the embodiment shown in FIGS. 5 and 6, but in which the panels are in metal sheet instead of wood. In FIGS. 7 and 8 the corresponding members have been given the same reference numerals as in FIGS. 5 and 6, but with the addition of a figure 1. The rigidity of the sheet metal panels has been increased by longitudinal ribs 1'c approximately in the middle of the width of each panel, and by longitudinal flanges 1'd along one edge, formed by folding back that edge, and 2'e, for example, along another edge, so as to form lap-joints along the outside surfaces of the adjacent panels.

Moreover, in order to keep the dimensions of the slots such as 23' as narrow as possible, the connecting strips 3' of the panels have been given a cylindrical shape in their central portions, as shown at 3'a, coaxial with the corresponding hinge 17'.

This embodiment operates in the same way as the embodiment shown in FIGS. 5 and 6.

Whatever embodiment is chosen the screen may be arranged so that the axes of the hinges are horizontal, and by placing the lap-joints in the appropriate direction a tight wall can be made.

FIGURES 9 to 11 show another embodiment which differs from those of FIGURES 1 to 8 in that instead of auxiliary panels it has arms such as 106, 102a, 101b and 108a. In these FIGS. 9 to 11 the members corresponding to those in FIGS. 5 and 6 are indicated by the same reference numerals increased by 100 units.

The panels like 101a are broader than the intermediate panels like 102b and have a rib 131 along one of their edges, this rib having grooves 132 in which the hinges 117 are mounted.

Each arm such as 102a is rigidly connected with the corresponding panel 102b by means of a strip 104, which constitutes a sort of extension of this arm.

The extreme edges of the rib 131 of the panel 101a lie against the edge of the adjacent panel 102b when the screen is unfolded. During the folding movement the extreme edge of this rib moves along the inside surface of the screen in the shape of a portion of cylindrical surface of the strip 104 coaxial with the hinge 117.

The operation of this embodiment is the same as that of the embodiment shown in FIGS. 5 and 6, and it too presents a surface on which no fitting such as hinge, arm or connecting strip is visible.

In a variant shown in FIGS. 12 to 14, which differs from the embodiment of FIGS. 9 to 11 in that the wooden panels are replaced by panels of sheet metal, the corresponding members have been indicated by the same reference numerals as those in FIGS. 9 to 11, but with the addition of a figure 1. A panel such as 101'a has longitudinal ribs 101'c approximately in the middle of its width and 101'g along the edge near the axis of hinges such as 117'.

The extreme edge 102'g (FIG. 13) for example of panels such as 102'b is folded back so that it can cover the similarly folded edge 101'g (see also FIG. 12) of the panels such as 101'a, in such a way that these edges, shown at a distance from each other in FIG. 13 where the screen is folded up, cover each other exactly, as shown in FIG. 12, when the screen is open.

The strips 103' form in one portion an arc of a circle 103'a (FIG. 12) of relatively small radius, to allow the passage of the edge 101'g (FIG. 13) of the adjacent panel, while the strips 104' comprise a cylindrical portion 104'a of radius great enough to allow the passage of the edge 101'g during the manipulation of the screen, but barely greater than this edge's radius of displacement, so that the space taken up by the folded screen is not increased because of it.

Finally, in FIGS. 15 to 18, another embodiment has been shown in which all the panels are wooden and which is therefore related to the embodiment shown in FIGS. 1 to 6. The members in FIGS. 15 to 18 corresponding to those in FIGS. 1 to 6 have been designated by the same reference numerals increased by 200 units.

The essential feature of this embodiment is that every other main panel, such as panel 202b, and the auxiliary panel 202a which is rigid with it are constituted by a single part, viz. the panel 202. The hinges 217 are mounted in indentations 220 in the center portion of the panel 202, at a place where its thickness is approximately twice the thickness of it along the length of each of the partial panels 202a and 202b which constitute it.

Each strip such as 223 connecting a main panel 201a to an auxiliary panel 201b is of slightly different shape, so that its two ends are laid flat against the inside surfaces of these two panels instead of being laid against the outside surface of the auxiliary panel, as in the embodiment shown in FIG. 5.

These strips, therefore, not only pass through slots in the panel 202, but also through slots 229 in the corresponding edge of the auxiliary panel 201b.

All the panels are of the same thickness, and when the screen is folded the panels are laid against each other except at the site of the hinges, where they are simply separated by the thickness of these hinges.

The strips are more discrete in the embodiments described above, on that surface where they are still visible.

The screen can be put together as follows: First all the panels 202 are assembled by means of the hinges with the panels 201a and 201b, taking into consideration the respective position of these panels in relation to the slots in the panel 202. All the panels such as 201b are then equipped with their connecting strips, and then, after putting these assemblies together, the strips of one assembly are merely passed through the slots in the panels 202 of the following assembly, and the panel 201a of the following assembly is fixed there. At each operation the strips have to be fixed to the panels 202 of the assembly which they pass through.

Finally, an opaque fabric or any other material of suitable opaque sheeting is struck on to the inside surface of the main panels, at least to the right of the joints of the main panels, in order to make the open screen opaque.

While particular embodiments of this invention have been illustrated and described herein, it is intended that this invention be not limited to such disclosures, and changes and modifications can be made and incorporated within the scope of the claim.

I claim:

A folding screen comprising a plurality of rectangular main panels and rectangular auxiliary panels, respective main panels being hingedly joined together along one longitudinal side thereof in pairs; said main panels having their other longitudinal sides rigidly connected to respective auxiliary panels extending substantially in the planes of said main panels; said auxiliary panels being hingedly joined together in pairs, and said pairs being hingedly joined together; said main panels and said auxiliary panels, at their points of rigid connection, being arranged to intersect each other to form joined lozenges; the hinge connection between adjacent pairs of auxiliary panels at the points of intersection with pairs of main panels lying within the extension of the planes of the outer surfaces of said main pairs of panels, so that the auxiliary panels at said intersections extend forward of said last hinge connection to cover any openings between the adjacent pairs of main panels; said rigid connections of the main panels with the auxiliary panels being arranged on the inner surfaces of the main panels and vertically disposed with respect to each other and forming said lozenges with said last hinge connection.

References Cited by the Examiner

UNITED STATES PATENTS

| | | | |
|---|---|---|---|
| 2,976,923 | 3/1961 | Hirashiki | 160—229 |
| 3,033,283 | 5/1962 | Jorgensen | 160—183 |
| 3,073,382 | 1/1963 | Zimmerman et al. | 160—183 |
| 3,133,589 | 5/1964 | Harris | 160—84 |

FOREIGN PATENTS 1,163,567   4/1958   France.

HARRISON R. MOSELEY, *Primary Examiner.*

REINALDO P. MACHADO, *Examiner.*

P. M. CAUN, *Assistant Examiner.*